No. 862,688. PATENTED AUG. 6, 1907.
H. WHITE.
SOLDERING DEVICE.
APPLICATION FILED MAR. 17, 1906.
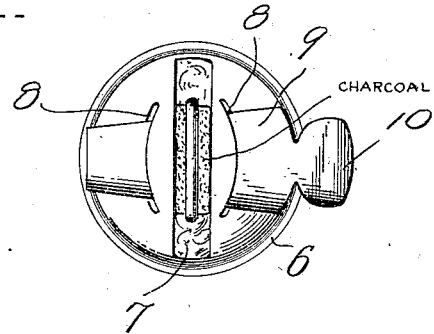
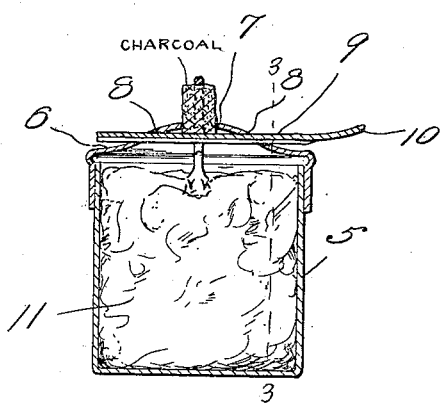
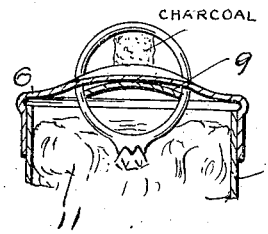
Witnesses
Inventor
Herbert White
Attorneys

UNITED STATES PATENT OFFICE.

HERBERT WHITE, OF HANOVER, ILLINOIS.

SOLDERING DEVICE.

No. 862,688.  Specification of Letters Patent.  Patented Aug. 6, 1907.

Application filed March 17, 1906. Serial No. 306,684.

*To all whom it may concern:*

Be it known that I, HERBERT WHITE, a citizen of the United States, residing at Hanover, in the county of Jo Daviess, State of Illinois, have invented certain new and useful Improvements in Soldering Devices; and I do hereby declare the following to be a full, clear, and exact description of the invention, such as will enable others skilled in the art to which it appertains to make and use the same.

This invention relates to soldering devices, and more particularly to that class used by jewelers in soldering rings or the like, and the primary object of the invention is to provide a device of this character adapted for use in connection with a ring of any ordinary size to hold the same firmly in position while being soldered and in such a manner that the setting of the ring will at all times be protected not only from the solder itself but also from heat.

Broadly speaking, the invention resides in the provision of a sponge container having a top which is outwardly bulged or, in other words, is concavo-convex and which is provided in its bulged portion with a transversely extending central slot through which the ring is to be engaged and with smaller slots upon opposite sides of the central slot, there being a key engaged through the slots and held firmly therein to support a lump of charcoal upon which the heating ends of the ring to be soldered rest.

In the accompanying drawings: Figure 1 is a top plan view of the invention, Fig. 2 is a vertical sectional view through the same taken longitudinally of the key, and, Fig. 3 is a detail vertical sectional view on the line 3—3 of Fig. 2 taken transversely of the key and between one of the side slots and the side of the sponge container.

Referring more specifically to the drawings, the numeral 5 denotes a receptacle which is preferably cylindrical in form and 6 the cover for the same. This cover is concavo-convex in form and is provided with a transversely extending major slot 7 which is of such size that any ordinary sized ring may be engaged therethrough and with a pair of minor slots 8 which lie at the opposite sides of the major slot and which extend in a common horizontal plane, being straight. Furthermore, these minor slots 8 are in alinement with each other and are of the same extent for a purpose to be now described.

In order that a ring engaged through the major slot 7 may be held in proper position for the soldering operation and in order to form a support for the usual lump of charcoal, which is indicated in the drawings, employed in this process, I provide a key 9 which is formed of resilient sheet metal and is slightly curved in cross section to cause it to have a frictional engagement with the upper and lower edges of the minor slots 8 through which it is engaged, it being understood that the tendency of the key is to become flattened out when forced into the slots and by thus becoming flattened sufficient friction or binding force is exerted to securely retain the key in proper position. In addition to being curved transversely this key is also wedge-shaped and is so formed to admit of its being engaged through the ring which it is designed to support, although it is to be understood that the ring does not depend entirely upon the wedge for its support but upon the combined agencies of the wedge-shaped key and the block of charcoal which is supported upon the key. At its broad end the wedge-shaped body portion of the key is provided with a finger-piece 10 by means of which the key may be readily inserted and removed from the minor slots 8.

In using my device, a piece of sponge or other soft porous material 11 is placed in the receptacle 5 and is moistened with water. The ring is then engaged through the major slot with its jewel resting upon the moistened material 11, the key inserted through the minor slots and through the ring until it tightly fits in the slots, and the usual block of charcoal placed between the key and the band of the ring after which the solder may be applied in the usual manner.

What is claimed is:

1. A device of the class described comprising a receptacle, a convexed cover for the receptacle, said cover having a major slot formed therethrough and having alining minor slots formed one upon each side of said major slot, a key engaged through the minor slots and through a ring which is inserted in the major slot, said key having frictional engagement with the upper and lower edges of the minor slots, and a block of charcoal located on the key and extending up through the major slot and beneath the portion of the ring to be soldered.

2. A device of the class described comprising a receptacle, a convexed cover for the receptacle, said cover having a major slot formed therethrough and having alining minor slots formed one upon each side of said major slot, a transversely curved key engaged through the minor slots and through a ring which is inserted in the major slot, said key having a frictional engagement with the upper and lower edges of the minor slots, and a block of charcoal located on the key and extending up through the major slot and beneath the portion of the ring to be soldered.

In testimony whereof, I affix my signature, in presence of two witnesses.

HERBERT WHITE.

Witnesses:
ELVA R. WINTER,
HENRY WINTER.